(No Model.)

A. O'BRIEN.
URINAL.

No. 503,491.   Patented Aug. 15, 1893.

Witnesses

Inventor
Arthur O'Brien
By A.W.W. Dudley
Attorney

UNITED STATES PATENT OFFICE.

ARTHUR O'BRIEN, OF HELENA, MONTANA.

URINAL.

SPECIFICATION forming part of Letters Patent No. 503,491, dated August 15, 1893.

Application filed May 7, 1892. Renewed July 13, 1893. Serial No. 480,422. (No model.)

*To all whom it may concern:*

Be it known that I, ARTHUR O'BRIEN, a citizen of the United States, residing at Helena, in the county of Lewis and Clarke and State of Montana, have invented certain new and useful Improvements in Urinals; and I do hereby declare the following to be a full, clear, and exact description of the invention, such as will enable others skilled in the art to which it appertains to make and use the same.

My present invention has reference to urinals and has for its object to improve the general construction and operation, and to provide improved means for flushing the bowl, for carrying off the overflow, and for the ventilation of the bowl and soil pipe.

Another object is to provide ready means whereby the urinal may be thoroughly cleansed, and obstructions in the trap or water pipe removed.

My invention consists in the construction, relative arrangement and operation of the several parts constituting my improved urinal, whereby the desired objects are attained, all of which will be hereinafter fully and clearly explained.

Figure 1:
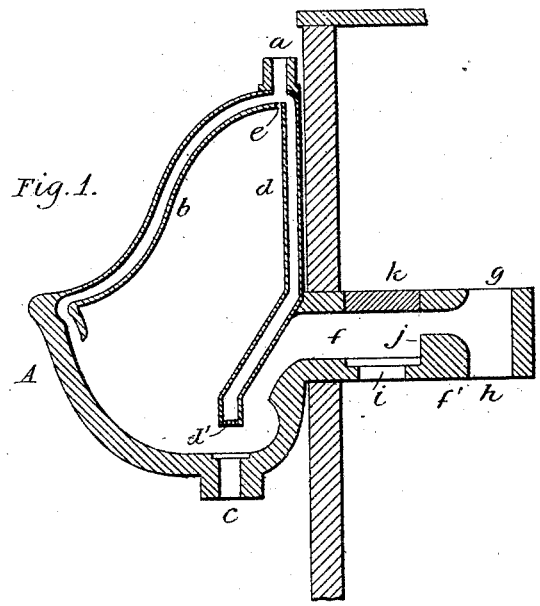
Figure 2:
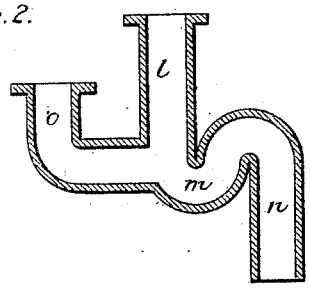

Reference being had to the accompanying drawings which form a part of this specification, Figure 1 represents in vertical, central section my improved urinal, and Fig. 2 a sectional view of the branch pipes, trap and waste pipe employed in connection therewith.

The reference letter A denotes the bowl of the urinal which is formed with the supply inlet $a$, flushing rim $b$ and waste outlet $c$ of common construction. At the rear of the bowl is arranged a channel $d$ the upper end of which is open and is adjacent to and communicates with the inlet. The lower end of the channel is provided with a series of perforations $d'$, and terminates at a point directly over and down near to the waste outlet. The water entering by the said inlet finds its way through the flushing rim, and channel, and through an opening $e$ between the upper ends of the rim and channel, and thoroughly cleanses the bowl of all impurities. That portion of the water passing through the channel is discharged therefrom directly into the branch waste pipe, and the result is that said pipe is kept thoroughly clean.

Extending from the rear of the bowl is a chamber $f$, which is preferably formed in a casting $f'$ integral with the bowl, and terminates in an air vent $g$, and an overflow pipe $h$ which communicates directly with the sewer.

$i$ is a passage through which the overflow passes to the waste pipe. Adjacent to said passage is a dam $j$, which operates, when the drain pipes are free, to prevent the overflow from reaching the pipe $h$. In the event of a stoppage in the trap or waste pipe the overflow upon reaching a level above the dam, is carried off by the pipe $h$, to the sewer. Arranged above the passage $i$ is an opening normally closed by a suitably constructed plug $k$, which upon being removed gives access to the pipe $l$, trap $m$ and waste pipe $n$ for the purpose of removing obstructions and thoroughly cleaning said passages. The pipe $l$ is connected with the passage $i$ by a section of pipe, not shown, and the branch $o$ is likewise connected with the discharge outlet in the bowl. The impure air and vapors find exit through the chamber $f$ to the vent $g$ and from thence by a line of pipe to a point outside of the building, and hence a thorough ventilation of the bowl and room is attained.

By my invention I am enabled to construct a perfect sanitary urinal in which provision is made by a thorough flushing of the bowl and waste pipe, for carrying off the overflow, whether the waste pipe be stopped up or not, for thoroughly ventilating the bowl and room, and for cleaning the waste pipe and trap, and removing obstructions therefrom.

I claim—

1. In a urinal, the combination with a bowl having a flushing rim, a water inlet and outlet a channel communicating with the inlet and extending downward to a point near to and over the outlet, and a passage between the upper ends of the rim and channel for the purposes set forth.

2. In a urinal, the combination with a bowl having a water inlet and outlet and a flushing rim, a chamber extending outward from the rear of the bowl and communicating therewith, an overflow passage in said chamber, an opening above said passage and a removable plug for said opening, for the purposes set forth.

3. In a urinal, the combination with a bowl having a water inlet and outlet, and a flushing rim, a chamber extending outward from the rear of the bowl, and having an overflow passage leading to the waste pipe, and a second overflow leading to the sewer, for the purpose set forth.

4. In a urinal, the combination with a bowl having a water inlet and outlet and a flushing rim, a chamber extending outward from the rear of the bowl, and having an overflow leading to the waste pipe, an opening above said overflow, a removable plug for said opening, a second overflow leading to the sewer, a dam between the two overflows, and an air vent to the rear of the chamber, all for purposes set forth.

In testimony whereof I affix my signature in presence of two witnesses.

ARTHUR O'BRIEN.

Witnesses:
- E. W. KNIGHT, Jr.,
- GEO. H. HILL.